United States Patent [19]
Yamamoto et al.

[11] Patent Number: 5,099,352
[45] Date of Patent: Mar. 24, 1992

[54] REFLECTOR OSCILLATING APPARATUS

[75] Inventors: Tetsu Yamamoto; Takaharu Ueda; Daisuke Ogata; Kiyoshi Funai; Takashi Yumura; Shigeki Mizuno, all of Hyogo, Japan

[73] Assignee: Mitsubishi Denki Kabushiki Kaisha, Tokyo, Japan

[21] Appl. No.: 594,483

[22] Filed: Oct. 5, 1990

[30] Foreign Application Priority Data

Oct. 13, 1989 [JP] Japan .................................. 1-266696
Oct. 13, 1989 [JP] Japan .................................. 1-266697

[51] Int. Cl.$^5$ ............................................ G02B 26/08
[52] U.S. Cl. ............................................ 359/213; 359/223
[58] Field of Search ................ 350/6.6, 6.9, 6.1, 6.5, 350/6.91, 486, 487, 611-614, 637

[56] References Cited

U.S. PATENT DOCUMENTS

| | | | |
|---|---|---|---|
| 4,613,203 | 9/1986 | Proetel et al. | 350/6.6 |
| 4,861,149 | 8/1989 | Ealey | 350/487 |
| 4,943,771 | 7/1990 | Fuschetto | 350/611 |
| 4,958,894 | 9/1990 | Khowles | 350/6.6 |
| 4,959,568 | 9/1990 | Stokes | 350/6.6 |

FOREIGN PATENT DOCUMENTS 58-189607 11/1983 Japan .

OTHER PUBLICATIONS

K. R. Lorell et al., "A Microprocessor-based Position Control System for a Telescope Secondary Mirror", Automatica vol. 20, No. 3, pp. 295-308, 1984.

*Primary Examiner*—Bruce Y. Arnold
*Assistant Examiner*—James Phan
*Attorney, Agent, or Firm*—Rothwell, Figg, Ernst & Kurz

[57] ABSTRACT

Provided is a reflector oscillating apparatus in which the positions of a reflector and a compensating plate are detected so as to perform positioning with a high degree of positional accuracy (closed-loop control). Further, since the reflector and the compensating plate are driven by a couple of forces, no reaction forces by drive forces are applied to a rotary shaft and a support section, and accordingly, it is possible to enhance the positioning accuracy and to realize a short transient time and a large amplitude. Further, the magnetic circuit is commonly used so that the dimensions of a motor, that is, the height thereof in particular, can be reduced, irrespective of a large drive force. Accordingly, the reflector oscillating apparatus can be greatly miniaturized. Further, by commonly using the magnetic circuit, the impedance of the coil can be reduced, thereby it is possible to drive the apparatus at a high speed with a low drive voltage.

4 Claims, 12 Drawing Sheets

REFLECTOR OSCILLATING APPARATUS

BACKGROUND OF THE INVENTION

1. Field of the Invention

The present invention relates to a reflector oscillating apparatus for oscillating a reflector such as a secondary mirror or the like in a rectangular wave shape pattern at a high speed with a high degree of accuracy in order to remove the affection of background noise introduced from the earth atmosphere by use of a space chopping process, in a telescope, in particular an infrared telescope. The above-mentioned space chopping process is a method in which light from a celestial body, including background noise and the background noise alone are alternately observed, and then differences therebetween are obtained so as to remove observed noise. Particularly, the reflector oscillating apparatus concerning the present invention is arranged to be used in a high resolution telescope which can observe a celestial body that is far away from the earth by a distance of more than 15 billion light years. In such a telescope, the diameter of the reflector is larger than that of a conventional one, and further, a higher degree of accuracy of oscillation, a shorter oscillating time (transient time) and a larger amplitude of oscillation are required.

2. Description of the Prior Art

Figure 1:
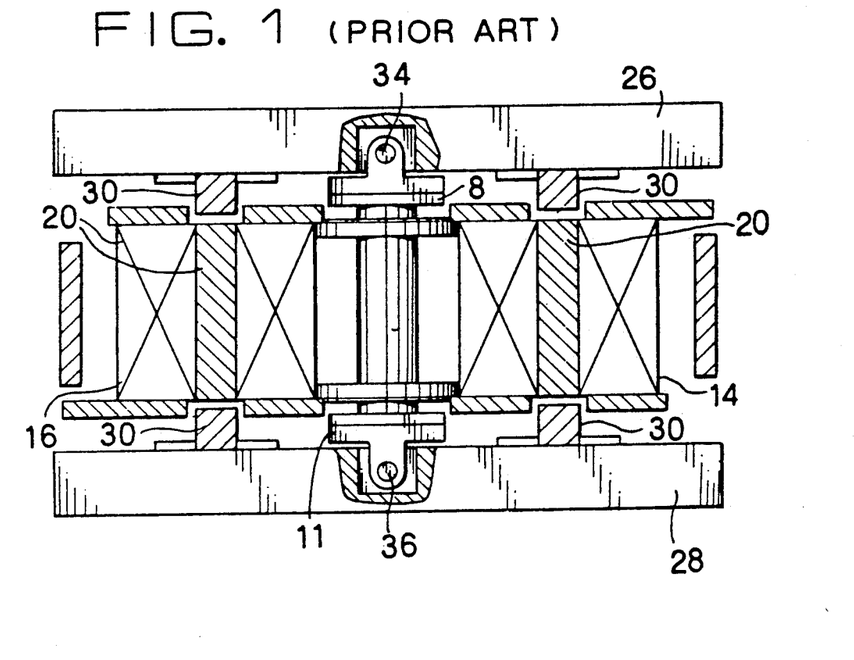
FIG. 1 is a partly sectioned constructive view illustrating a conventional secondary mirror oscillating apparatus.
Figure 2:
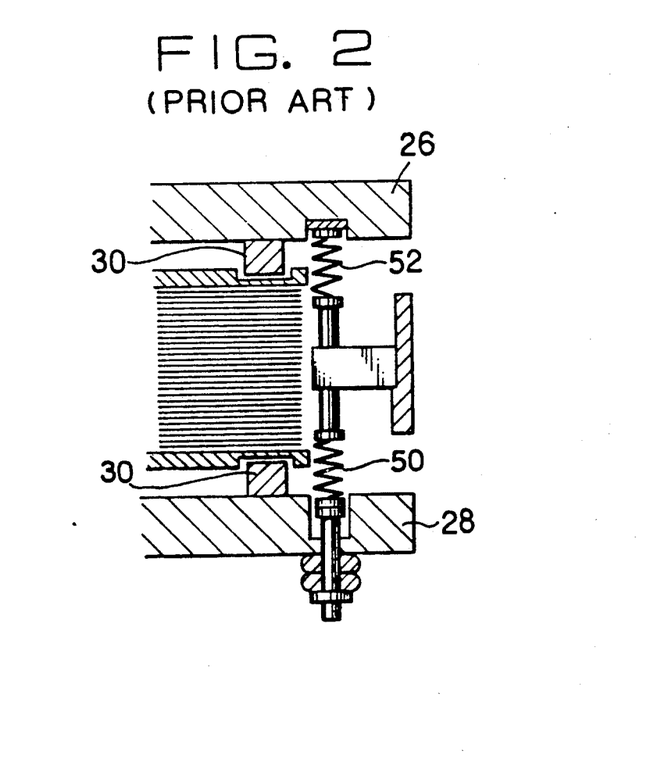
FIG. 2 is an enlarged constructive view illustrating a spring return mechanism in the conventional secondary mirror oscillating apparatus.
Figure 3:
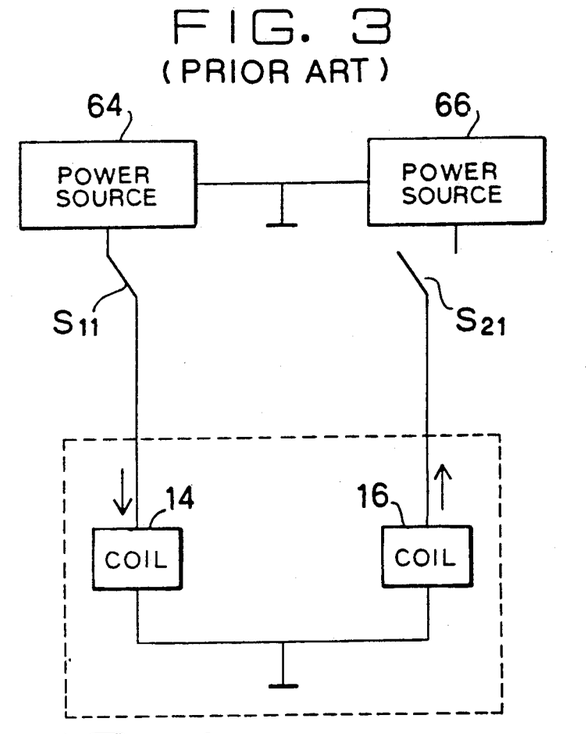
FIG. 3 is a view illustrating a control circuit in the conventional secondary mirror oscillating apparatus.
Figure 4:
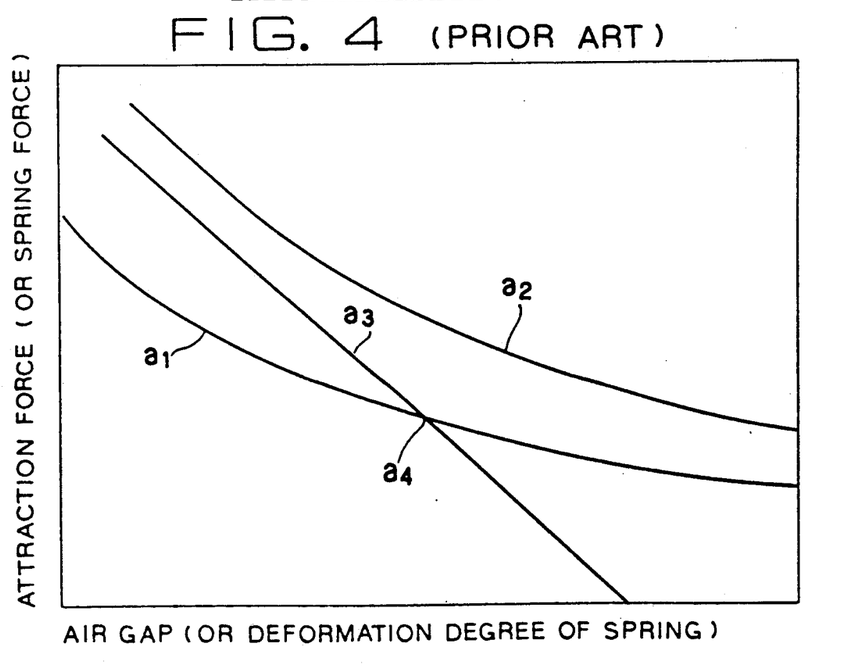
FIG. 4 is a relational view illustrating an equilibrium between an actuator and an adjusting spring device.

FIGS. 1 is a cross-sectional view illustrating a conventional secondary mirror oscillating apparatus disclosed in U.S. Pat. No. 4,613,203 issued Sept. 23, 1986. FIG. 2 is an enlarged view illustrating a return spring device incorporated in this secondary mirror oscillating apparatus. FIG. 3 is a view illustrating a drive circuit for an actuator. Further, FIG. 4 is a view showing a force balance between the actuator and the return spring device. In these figures, there are shown a secondary mirror 26, a compensating plate 28, an iron core 20 in the actuator for driving the secondary mirror 26 and the compensating plate 28, coils 14, 16 in the actuator, magnetocoercing elements 30 attached to the secondary mirror 26 and the compensating plate 28, oscillating shafts 34, 36 for the secondary mirror 26 and the compensating plate 28, springs 50, 52 for holding respectively the secondary mirror 26 and the compensating plate at their zero positions, change-over switches s11, s12 for driving the actuator in a rectangular wave shape pattern, and drive power sources 64, 66 for the actuator. Further, in FIG. 4, the abscissa gives the air gap between the iron core 20 and the magnetocoercing element 30 in the actuator or the deformation degree of the springs 50, 52, and the ordinate gives an attraction force effected between the iron core 20 and the magnetocoercing elements 30 or the force generated by the springs 50, 52. Further, in this figure, a curve a1 exhibits a relationship between the above-mentioned attraction force which is generated when a small magnitude of current is applied to the coil 14 and the above-mentioned air-gap, a curve a2 exhibits a relationship between an attraction force which is generated when a large magnitude of current is applied to the coil 14 and the air-gap, and a curve a3 exhibits a force generated by the springs 50, 52 and the deformation degree. Further, a cross-point a4 is a point at which the above-mentioned attraction force and the force generated by the springs are balanced with each other.

Then, explanation will be made of operation. In this apparatus, an attraction force is effected between the iron core 20 on the coil 14 side and the magnetocoercing elements 30, and accordingly, the secondary mirror 26 and the compensating plate 28 are oscillated clockwise and counterclockwise about the oscillating shafts 34, 36, respectively. At this time, the springs 50, 52 on the coil 14 side are contracted while the springs 50, 52 on the coil 16 side are expanded, and accordingly, the return spring device tends to return the secondary mirror 26 and the compensating plate 28 to their zero positions. The secondary mirror 26 and the compensating plate 28 are rotated to positions where the attraction force of the actuator and the above-mentioned return force are balanced with each other, and are stopped at these positions as shown in FIG. 4. When the switch s11 shown in FIG. 3 is turned off while the switch s21 is turned on, a current through the coil 14 is broken and a current runs through the coil 16, and accordingly, an attraction force is effected between the iron core 20 on the coil 16 side and the magnetocoercing elements 30. In this case, the secondary mirror 26 and the compensating plate 28 are rotated in the reverse direction, and then they are stopped similarly at their balanced position. With the repetitions of the above-mentioned operation by successively and alternately turning on and off the switches s11, s21, the secondary mirror 26 and the compensating plate 28 are oscillated in a rectangular wave shape pattern. Although the period of the oscillation can be changed by changing change-over periods, the time of oscillation between one of the stop positions to the other one of them, that is, the transient time depends upon a natural oscillation period which is determined by the secondary mirror 26 and the springs 52 (the compensating plate 28 and the springs 50).

Since the conventional secondary mirror oscillating apparatus is constructed as mentioned above, there have been raised the following problems:

First, if the transient time were to be shortened, the stiffness of the springs 50, 52 should be increased. In this case, as understood from FIG. 4, the amplitude could hardly be made to be large up to a value which would have been obtained originally, even though the drive force is increased. Further, if it is desired to obtain a critical damping, the damping characteristics of a brake device (not shown) using an eddy current should be increased, resulting in occurrence of problems of increase in energy loss, and of large current which should be fed to the actuator in order to hold the secondary mirror 26 and the compensating plate at their stop positions, overcoming the highly stiff springs. Further, since the above-mentioned apparatus has such a structure that the drive force of the actuator acts upon the magnetocoercing elements 30 only on one side, when the drive force is increased, the bending force which is exerted to the secondary mirror 26 from the springs 50, 52 and the magnetocoercing elements 30 becomes large, and further a larger force is also exerted to the oscillating shafts 34, 35, thereby there has been raised a problem such that a sufficient degree of positioning accuracy cannot be obtained.

Figure 5:
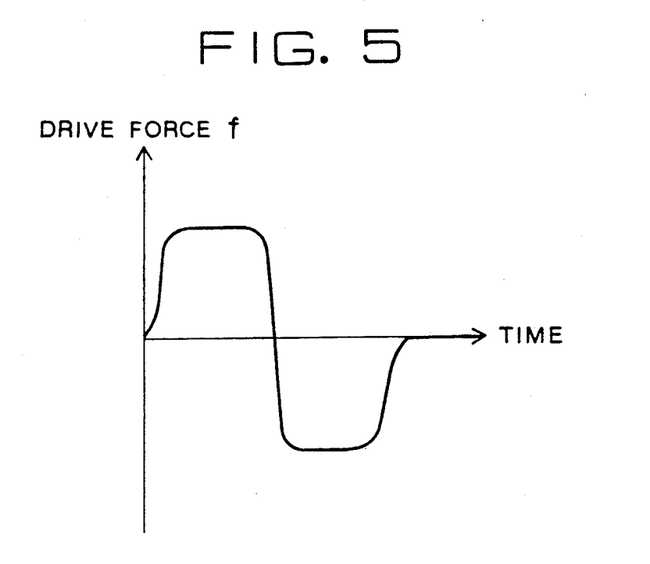
FIG. 5 is a view illustrating an optimum drive force waveform pattern of a secondary mirror.

Second, the force for driving the secondary mirror is determined by a difference between the attraction force between the iron core 20 and the magnetocoercing elements 30 and the resilient force given by the springs 50, 52, and accordingly, the secondary mirror cannot be driven in an optimum drive force wave pattern as shown in FIG. 5 which is disclosed, for example, in Japanese Patent Application 63-20722 filed by the present applicant, resulting in occurrence of such a fatal problem, in addition to the above-mentioned first problem, that the transient time cannot be shortened to less than a certain degree.

Third, as clearly shown in FIG. 4, since the attraction force between the iron core 20 and the magnetocoercing elements 30 is in reverse proportion to the square of the air gap (oscillating angle of the secondary mirror) between the iron core 20 and the magnetocoercing elements 30, should the above-mentioned attraction force be increased in order to increase the amplitude, the cross-point between the attraction force and the return force given by the springs 50, 52 cannot be obtained, and accordingly, there is raised an essential problem such that the secondary mirror cannot be stopped at a specific position (a large amplitude). It is noted that this problem imposes a great restriction upon the design of the apparatus.

Last, there is a problem such that the accuracy of oscillation cannot be enhanced exceeding a certain degree since the stop position of the secondary mirror is determined only by the equilibrium between the attraction force effected between the iron core 20 and the magnetocoercing elements 30 and the return adjusting force given by the springs 50, 52.

SUMMARY OF THE INVENTION

The present invention is devised in order to dissolve the above-mentioned problems, and accordingly, one object of the present invention is to provide an apparatus for oscillating a reflecting mirror such as a secondary mirror or the like, which can realize a higher accuracy of oscillation, a shorter transient time and a large amplitude while it is in a smaller size and can be operated by a lower drive voltage.

In order to attain the above-mentioned object, a reflector oscillating apparatus according to the first aspect of the present invention comprises: a reflector and a compensating plate which are opposed to each other and can oscillate about oscillating shafts supported respectively to stationary parts; first and second reflector drive coils disposed between the above-mentioned reflector and compensating plate and mounted on the reflector, respectively on both sides of the oscillating shafts; first and second compensating plate drive coils disposed between the reflector and the compensating plate and mounted on the compensating plate, respectively on both sides of the oscillating shafts; first and second reflector drive magnetic circuits and first and second compensating plate drive magnetic circuits stationarily disposed between the above-mentioned reflector and compensating plate, for generating attraction forces and repulsion forces, respectively, in association with above-mentioned coils so as to drive and oscillate the reflector and the compensating plate by use of a couple of forces; and sensors for detecting respectively oscillating angles of the above-mentioned reflector and compensating plate, whereby currents applied to the above-mentioned coils are subjected to feed-back control in accordance with signals from the above-mentioned sensors.

Further, the reflector oscillating apparatus according to another aspect of the present invention comprises: a reflector and a compensating plate which are opposed to each other and are oscillatable about oscillating shafts respectively supported by stationary sections; first and second reflector drive coils disposed between the above-mentioned reflector and compensating plate and mounted on the reflector on both sides of the oscillating shafts; first and second reflector drive magnetic circuits disposed between the above-mentioned reflector and compensating plate and mounted on the compensating plate on both side of the oscillating shafts, for generating attraction forces and repulsion forces in association with the above-mentioned reflector drive coils so as to drive and oscillate the reflector by a couple of forces; first and second compensating plate drive coils mounted on the above-mentioned compensating plate and on both sides of the oscillating shafts; first and second compensating plate drive magnetic circuits stationarily mounted being opposed respectively to the above-mentioned compensating drive coils, for generating attraction forces and repulsion forces in association with the above-mentioned compensating plate drive coils so as to drive and oscillate the compensating plate by a couple of forces; and sensors for detecting oscillating angles of the above-mentioned reflector and compensating plate, respectively, whereby currents applied to the above-mentioned coils are subjected to feed-back control in accordance with signals from the above-mentioned sensors.

Further, the reflector oscillating apparatus according to the third aspect of the present invention, comprises: a reflector and a compensating plate which are arranged being opposed to each other and are oscillatable about oscillating shafts supported respectively by stationary sections; first and second reflector drive coils disposed between the above-mentioned reflector and compensating plate and mounted on the reflector plate on both sides of the oscillating shafts; first and second compensating plates drive coils disposed between the above-mentioned reflector and compensating plate and mounted on the compensating plate on both sides of the oscillating shafts; first and second magnetic circuits disposed stationarily between the above-mentioned reflector and compensating plate, for generating attraction forces and repulsion forces in association with the first reflector drive coils and with the first compensating plate drive coils which are present in one and the same gap, and in association with the second reflector drive coils and with the second compensating plate drive coils in one and the same gap, respectively so as to drive and oscillate the above-mentioned reflector and compensating plates by a couple of forces; and sensors for detecting oscillating angles of the above-mentioned reflector and the compensating plate, whereby currents applied to the above-mentioned coils are subjected to feed-back control in accordance with signals from the above-mentioned sensor;

The above-mentioned and other objects and novel features of the present invention will be more completely clear when the following detailed description is read with reference to the accompanying drawings.

DETAILED DESCRIPTION OF THE PREFERRED EMBODIMENTS

Figure 6:
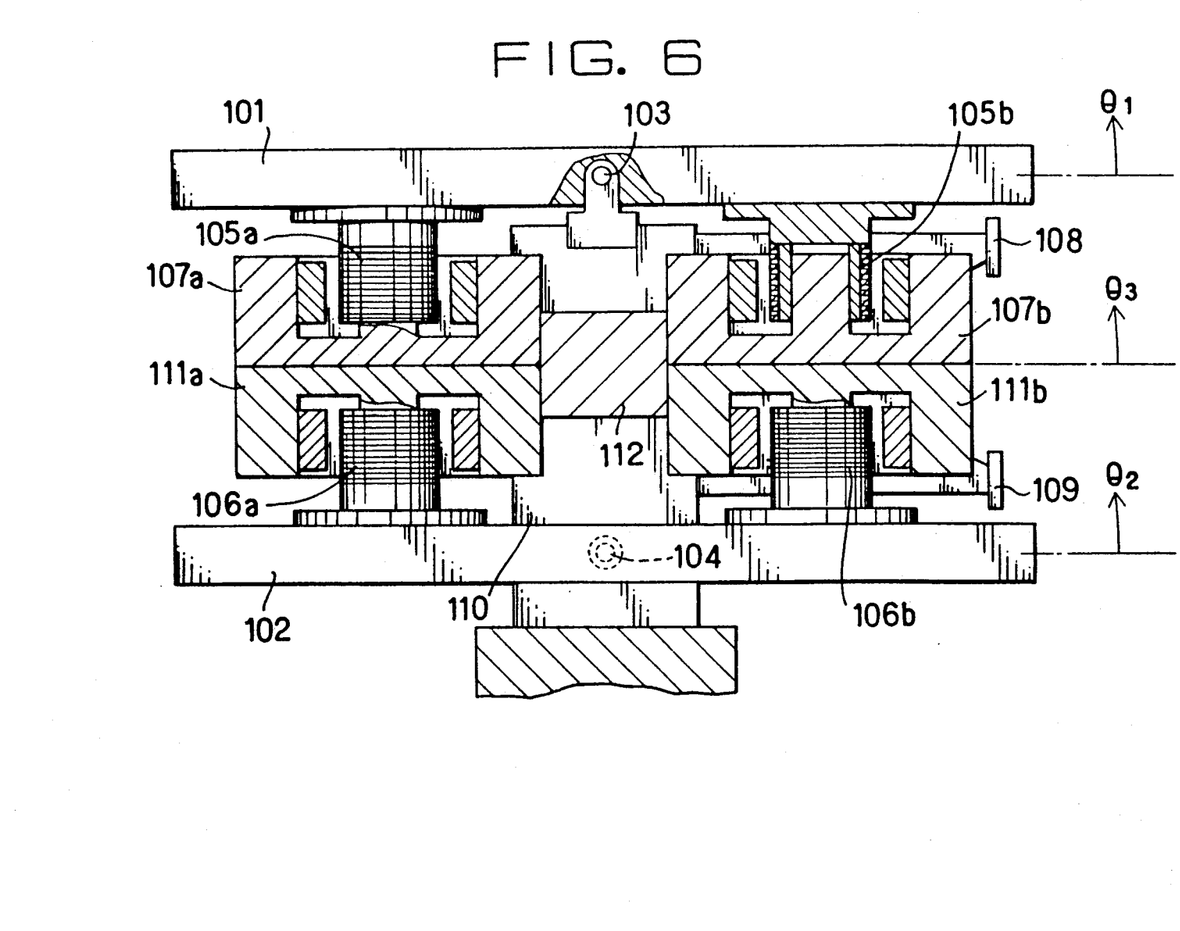
FIG. 6 is a partly sectioned constructive view illustrating a secondary mirror oscillating apparatus according to one embodiment of the present invention.
Figure 7:
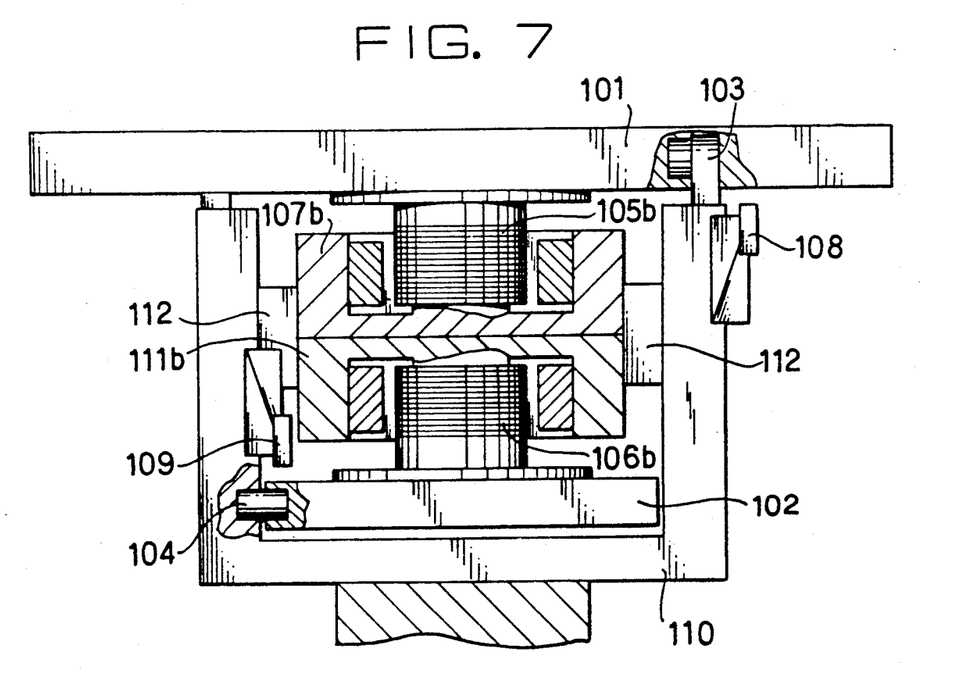
FIG. 7 is a side sectional view illustrating the apparatus shown in FIG. 6.
Figure 8:
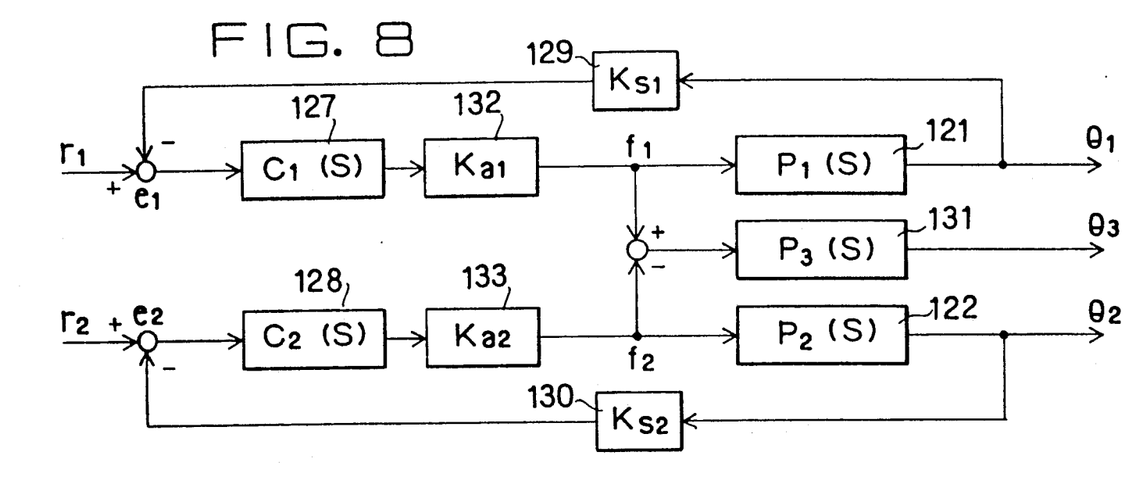
FIG. 8 is a block diagram illustrating a control system in the apparatus shown in FIG. 6.

Explanation will be made hereinbelow of one embodiment of the present invention with reference to the drawings FIG. 6 is a constructive view which shows a partly sectioned oscillating apparatus according to one embodiment of the present invention, and FIG. 7 is a side sectional view of the apparatus while FIG. 8 is a block diagram illustrating a control system in the apparatus. In these figures, there are shown a secondary mirror 101; a compensating plate 102; oscillating shafts 103, 104 which support oscillatably the secondary mirror 101 and the compensating plates 102, respectively; first and second secondary mirror drive linear motor coils 105a, 105b mounted on the secondary mirror 101 on both sides of the oscillating shaft 103; first and second compensating plate drive linear motor coils 106a, 106b mounted on the compensating plate 102 on both sides of the oscillating shaft 104; first and second secondary mirror drive linear motor magnetic circuits 107a, 107b; first and second compensating plate drive linear motor magnetic circuits 111a, 111b; high precision sensors 108, 109 for detecting oscillating angles (displacements) of the secondary mirror 101 and the compensating plate 102, respectively; a base 110 mounted thereon with the oscillating shafts 103, 104, the magnetic circuits 107a, 107b, 111a, 111b and the sensors 108, 109; and a support member 112 supporting the magnetic circuits 107a, 107b, 111a, 111b between the secondary mirror 101 and the compensating plate 102. Further, in FIG. 8, there are shown a transfer function 121 from the drive force of the linear motor to the oscillating angle of the secondary mirror 101; a transfer function 122 from the drive force of the linear motor to the oscillating angle of the compensating plate 102; a transfer function 131 from a force applied to the magnetic circuits 107a, 107b, 111a, 111b to the oscillating angle of the magnetic circuits 107a, 107b, 111a, 111b; transfer functions 127, 128 of stabilizing compensators; gains 129, 130 of the high precision sensors for detecting the oscillating angles (displacements) of the secondary mirror 101 and the compensating plate 102. Further, there are shown desired signals (r1, r2) of the secondary mirror 101 and the compensating plate 102; the oscillating angles $\theta 1$, $\theta 2$ of the secondary mirror 101 and the compensating plate 102, and the oscillating angle $\theta 3$ of the magnetic circuits 107a, 107b, 111a, 111b.

Next explanation will be made of operation. In the apparatus shown in FIGS. 6 to 8, the first and second secondary mirror drive coils 105a, 105b are connected in series or in parallel, and accordingly, currents equal to each other run therethrough in directions reverse to each other. The same is said to the first and second compensating plate drive coils 106a, 106b, and the coils 105a, 105b and the coils 106a, 106b are arranged so that the directions of currents are reverse to each other. Further, during normal drive operation, the desired signals r1, r2 are equal to each other, and accordingly, forces acting upon the four coils 105a, 105b, 106a, 106b are equal to each other. Since such forces act upon the secondary mirror 101 and the compensating plate 102a, the secondary mirror 101 and the compensating plate 102 are rotated about the oscillating shafts 103, 104, respectively, by a couple of forces. The desired signals r1, r2 are signals by which optimum drive force waveforms as shown in FIG. 5 can be obtained, and the position detecting sensors 108, 109 detect oscillating angles of the secondary mirror 101 and the compensating plate 102, respectively. Further, the control system feeds back the signals from the sensors so as to control the drive coils so that deviations between the feed-back signals and the desired signals r1, r2 are made to be zero, and accordingly, the secondary mirror 101 and the compensating plate 102 can be driven in accordance with the desired signals r1, r2 with a high degree of accuracy (about 0.1%). The apparatus according to this embodiment is operated as mentioned above, and thereby the following excellent results can be realized, in addition to the highly accurate drive.

1) Since the resultant of reaction forces acting upon the magnetic circuits 107a, 107b, 111a, 111b becomes zero, no forces act upon the base 110 and the support member 112.

2) Since the secondary mirror 101 is oscillated by a couple of forces, no "bending force acting upon the secondary mirror by coils and return springs" which have been produced by conventional apparatus, occurs.

3) Since the secondary mirror 101 and the compensating plate 102 are oscillated by a couple of forces, no reaction forces act upon the oscillating shafts 103, 104. In the case of using torsion springs for the oscillating shafts, although a moment in proportion to the spring constant and the oscillating angle acts upon the base 110, the oscillating angles of the secondary mirror 101 and the compensating mirror 102 are controlled actively by the control system, and accordingly, the spring constant of the torsion springs can be made to be extremely small, thereby it is possible to make the moment transmitted to the base 110 substantially zero.

As mentioned above, with the apparatus according to this embodiment, there is given such an essential feature that the force acting upon the base 110 can be substantially zero even though the drive force is increased in order to attain speed-up of the drive, a large-size secondary mirror and a large drive amplitude.

Figure 9:
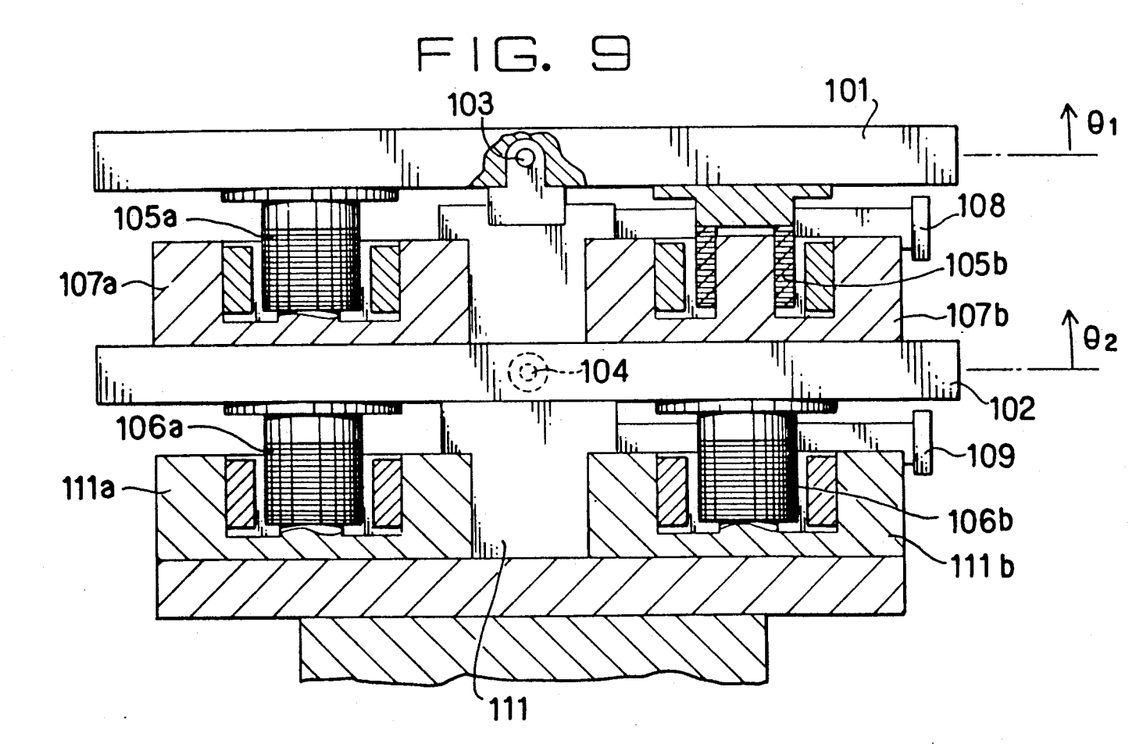
FIG. 9 is a partly sectioned constructive view illustrating a secondary mirror oscillating apparatus according to another embodiment of the present invention.
Figure 10:
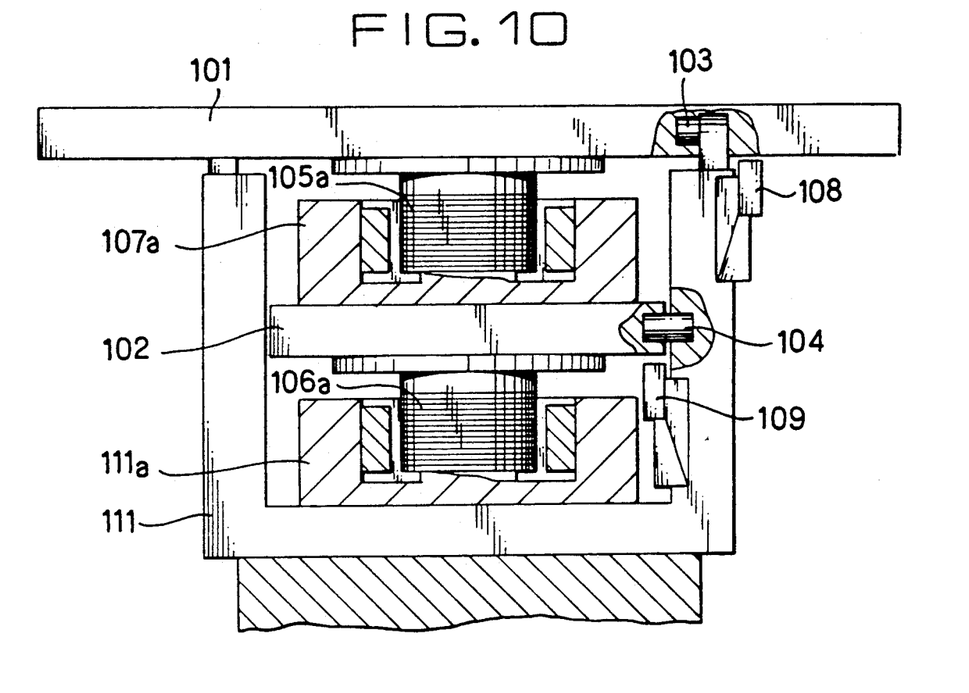
FIG. 10 is a side sectional view illustrating the apparatus shown in FIG. 9.
Figure 11:
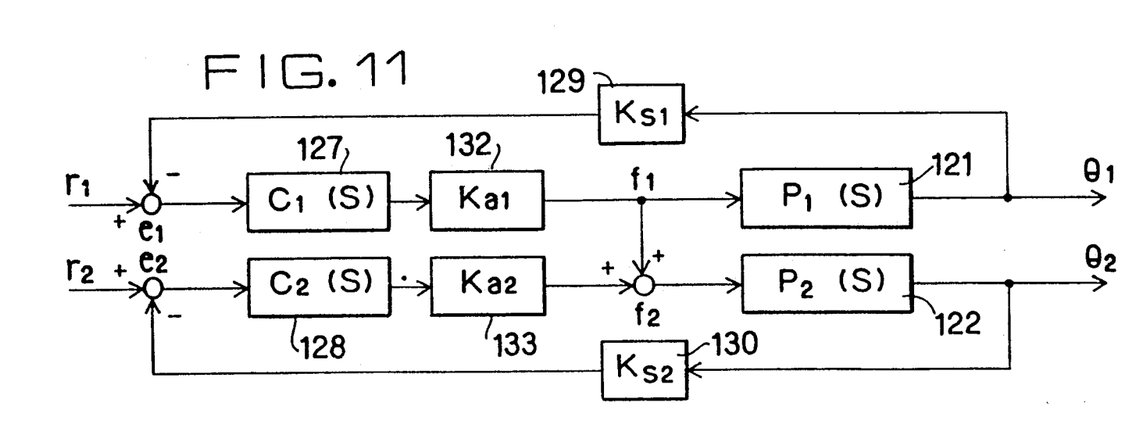
FIG. 11 is a block diagram illustrating a control system in the apparatus shown in FIG. 9.

Next, explanation will be made of another embodiment with reference to the drawings. FIG. 9 is a constructive view illustrating a secondary mirror oscillating apparatus according to the above-mentioned another embodiment of the present invention. FIG. 10 is a side view illustrating the apparatus shown in FIG. 9, and FIG. 11 is a block diagram illustrating a control system in the apparatus. In this embodiment, the secondary mirror 101 and the compensating plate 102 are supported being opposed to each other, oscillatably about the oscillating shafts 103, 104 fixed to the stationary parts, and the first and second secondary mirror drive coils 105a, 105b are disposed between the secondary mirror 101 and the compensating plate 102 and are mounted on the secondary mirror 101 on both sides of the oscillating shaft 103. Further, the first and second secondary mirror drive magnetic circuits 107a, 107b are disposed between the secondary mirror 101 and the compensating plate 102 and are mounted on the compensating plate 102 on both sides of the oscillating shaft 103 so as to generate attraction forces and repulsion forces in association with the secondary mirror drive coils 105a, 105b, thereby the secondary mirror 101 being driven and oscillated by a couple of forces. Further, the first and second compensating plate drive coils 106a, 106b are mounted on the compensating plate 102 and on both sides of the oscillating shaft 104, and the first and second compensating plate drive magnetic circuits 111a, 111b are secured being opposed respectively to the compensating plate drive coils 106a, 106b so as to generate attraction forces and repulsion forces in association with the compensating plate drive coils 106a, 106b, thereby the compensating plate 102 being driven and oscillated by a couple of forces.

Next, explanation will be made of operation and effects. In the apparatus shown in FIGS. 9 to 11, the secondary mirror drive coils 105a, 105b are connected in series or in parallel, and accordingly, currents equal to each other run therethrough in directions reverse to each other. The same is said to the compensating plate drive coils 106a, 106b. During normal drive operation of the secondary mirror, a desired signal is given as r1 while zero is given as r2. The secondary mirror 101 oscillates in a rectangular waveform pattern in accordance with the desired signal while the compensating plate 102 oscillates in association with the reaction forces of the secondary mirror drive magnetic circuits 107a, 107b. At this time, the compensating plate 102 is operated so as to suppress a d.c. component of the above-mentioned oscillation. The desired signal r1 is a signal by which an optimum drive force waveform as shown in FIG. 5 can be obtained. The position detecting sensors 108, 109 detect respectively oscillating angles of the secondary mirror 101 and the compensating plate 102 while the control system feeds back signals from the sensors so as to control the coils in order to allow the deviation between the desired signals r1, r2 and the feed-back signals to be zero. Accordingly, the secondary mirror 101 is driven in accordance with the desired signal r1 with a high degree of accuracy (0.1%). Since this apparatus is operated as mentioned above, the following excellent advantages can be realized in addition to the highly accurate drive:

1) Since the secondary mirror 101 oscillates by a couple of forces, no "bending force acting upon the secondary mirror by coils and return springs" which has been generated in the conventional apparatus, occurs.

2) Since the oscillating angles of the secondary mirror 101 and the compensating plate 102 are controlled actively by the control system, it is possible to facilitate the realization of a short transient time and a large amplitude drive of the secondary mirror.

Figure 12:
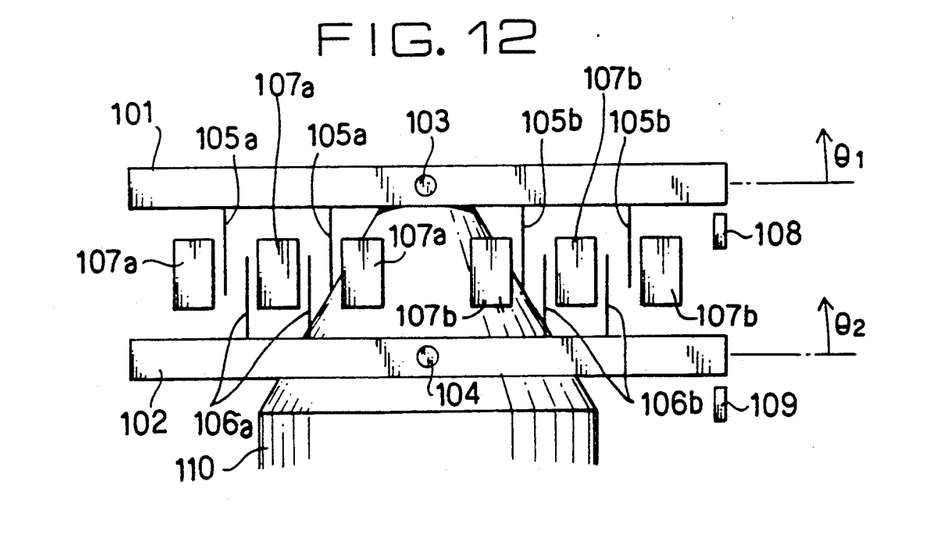
FIG. 12 is a constructive view illustrating the principle of a secondary mirror oscillating apparatus according to a third embodiment of the present invention.
Figure 13:
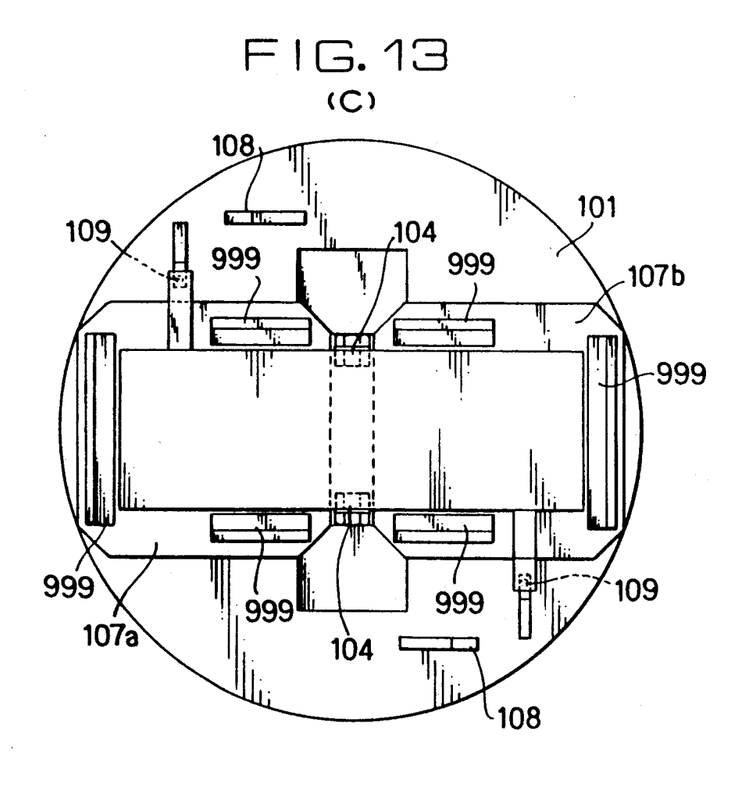
FIG. 13(a) is a constructive sectional view illustrating the apparatus shown in FIG. 12, as viewed from the oscillating shaft side.
FIG. 13(b) is a constructive sectional view illustrating an apparatus shown in FIG. 12, as viewed from on the side orthogonal to the oscillating shaft.
FIG. 13(c) is a plan view illustrating an essential part of the apparatus shown in FIG. 12, as viewed from below.
Figure 13A:
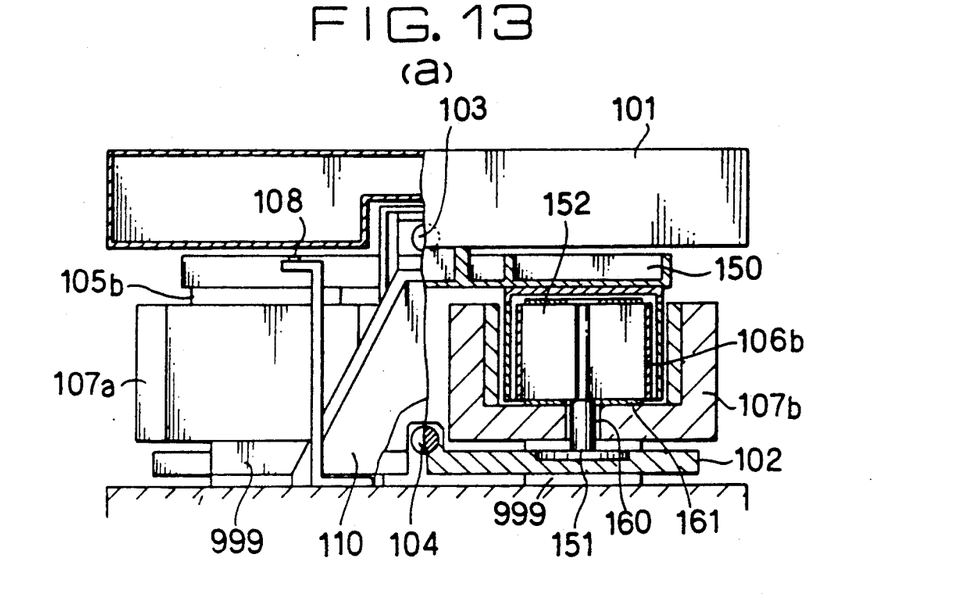
Figure 14:
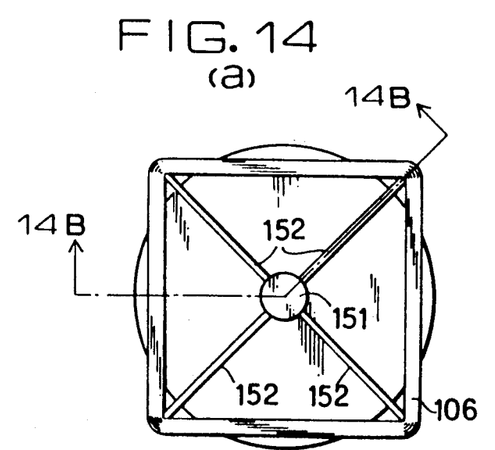
FIG. 14(a) is a plan view illustrating a compensating plate drive coil section as viewed from above.
FIG. 14(b) is a sectional view illustrating the coil section along the line 14B-14B in FIG. 14A.
Figure 15:
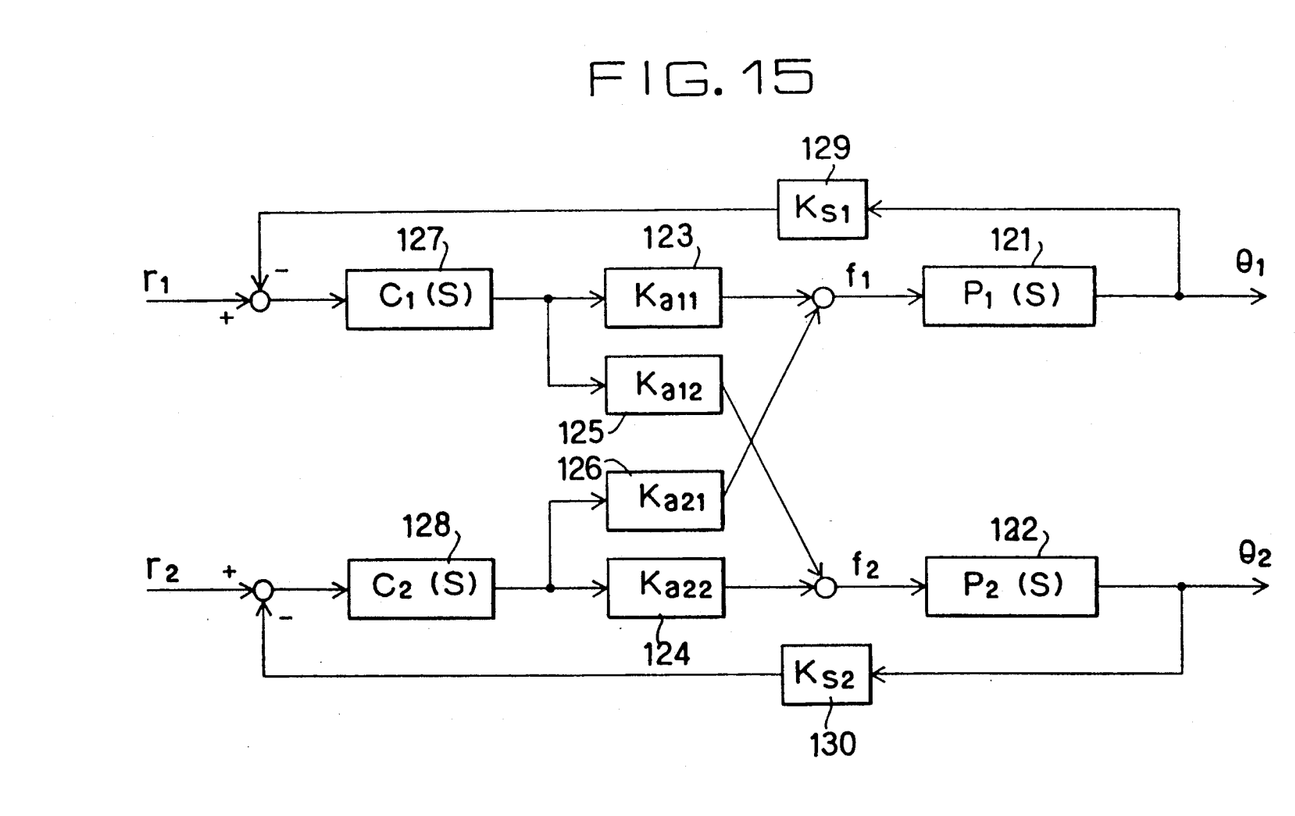
FIG. 15 is a block diagram illustrating a control system.

Then, explanation will be made of the third embodiment of the present invention with reference to the drawings. FIGS. 12 and 13 are principle and constructive views, respectively, illustrating a secondary mirror oscillating apparatus according to the above-mentioned third embodiment. FIG. 13(a) is a constructive sectional view illustrating the apparatus, as viewed from the oscillating shafts, and FIG. 13(b) a constructive sectional view illustrating the same, as view from the side orthogonal to the oscillating shaft while FIG. 13(c) is a plan view illustrating an essential part of the apparatus, as view from the lower side. Further, FIG. 14(a) is a plan view of a compensating plate drive coil section as viewed from above, FIG. 14(b) is a sectional view of the coil section along the line 14B-14B and FIG. 15 is a block diagram of control system. In these figures, there are shown a supporting member 150 which supports the secondary mirror drive coil 105 and transfers an angular moment to the secondary mirror 101, a center pole 151 and a planar plate 152 for supporting the compensating plate drive coil 106, the center pole 151 and the planar plate 152 constituting a support member so as to transmit an angular moment to the compensating plate 102, a through-hole 160 which is formed in the magnetic circuits 107, and through which the center pole 151 pierces, a slit 161 formed in the magnetic circuit 107 and through which the planar plate 152 pierces (this slit is formed extending from the open side of the magnetic circuit 107 to the bottom of the gap, but it does not pierce through the magnetic circuit 107 from the open side to the opposite side thereof); and a support bed 999 for supporting the magnetic circuit. That is, in this embodiment, the through-hole 160 is formed in each of the magnetic circuits 107, 107a, 107b at the center thereof, and a plurality of slits 161 are formed from the center to the gap, and accordingly, the coils 106, 106a, 106b are supported on the magnetic circuits 107a, 107a, 107b on the side remote from the open side, by means of the support members each composed of the center pole 151 and a plurality of plates 152 which pierce through the through-holes 160 and the slits 161.

Further, in FIG. 15, there are shown a transfer function 121 from the drive force of a linear motor to the oscillating angle of the secondary mirror 101, a transfer function 122 from the drive force of the linear motor to the oscillating angle of the compensating plate, a transfer function 123 from a current applied to the coil 105 to a drive force acting upon the coil 105, a transfer function 124 from a current applied to the coil 106 to a drive force acting upon the coil 106, a transfer function 125 from a current applied to the coil 105 to a drive force acting upon the coil 106, a transfer function 126 from a current applied to the coil 106 to a drive force acting upon the coil 105, transfer functions 127, 128 of stabilizing compensators, and gains 129, 130 of high precision sensors for detecting oscillating angles (displacements) of the secondary mirror 101 and the compensating plate 102 respectively. Further, there are shown desired orbits r1, r2 of the secondary mirror 101 and the compensating plate 102, drive forces (f1, f2) acting upon the secondary mirror 101 and the compensating plate 102, respectively, and oscillating angles θ1, θ2 of the secondary mirror 101 and the compensating plate 102.

Next, explanation will be made of operation. In the apparatus shown in FIGS. 12 to 15, the first and second secondary mirror drive coils 105a, 105b are connected in series or in parallel, and currents equal to each other run in directions reverse to each other. The same is said to the first and second compensating plate drive coils 106a, 106b, and further, the coils 105a, 106a and the coils 105b, 106b are arranged so as that the directions of currents are reverse to each other. Moreover, during normal drive operation, the desired signals r1, r2 are also equal to each other, and accordingly, forces acting upon the four coils 105a, 105b, 106a, 106b are equal to each other. When such forces act upon the secondary mirror 101 and the compensating plate 102, the secondary mirror 101 and the compensating plate 102 are rotated respectively about the oscillating shafts 103, 104 by a couple of forces. The desired signals r1, r2 are signals by which the drive forces f1, f2 give an optimum drive force waveform pattern as shown in FIG. 5, and the position detecting sensors 108, 109 detect oscillating angles of the secondary mirror 101 and the compensating plate 102, respectively. Further, the control system feeds back signals from the sensors to control the coils so as to make the deviations between the desired signals r1, r2 and the feed-back signals substantially zero, and accordingly, the secondary mirror 101 and the compensating plate 102 can be driven in accordance with the desired signals r1, r2 with a high degree of accuracy (about 0.1%). The present apparatus is operated as mentioned above, and accordingly, the following excellent advantages can be realized, in addition to the highly accurate drive operation:

1) Since the resultant of reaction forces acting upon the magnetic circuits 107, 107a, 107b becomes zero, no force acts upon the base 110;

2) Since the secondary mirror 101 is oscillated by a couple of forces, no "bending force acting upon the secondary mirror by coils and return springs" which has been inevitable in the conventional apparatus, occurs.

3) Since the secondary mirror 101 and the compensating plate 102 oscillate by a couple of forces, no reaction forces act upon the oscillating shafts 103, 104. In the case of using torsion springs for the oscillating shafts 103, 104, a moment in proportion to the spring constant and the oscillating angle acts upon the base 110. However, since the oscillating angles of the secondary mirror 101 and the compensating plate 102 are controlled actively by the control system, the spring constant of the torsion springs can be made to be extremely small, and accordingly, a moment transmitted to the base 110 becomes substantially zero.

As mentioned above, in the present apparatus, there can be given such a feature that the force acting upon the base 110 can be made to be substantially zero even though the drive force is made to be large due to the realization of speed-up of the drive, a large size of the secondary mirror and a large amplitude, and further, the following advantages can be obtained:

4) Since the above-mentioned first and second embodiments use four linear motors so that the dimensions thereof, that is, the height in particular become large, and further, since the mass thereof becomes large, a telescope is sometime deformed due to the weight of the reflector oscillating apparatus, and accordingly, there occurs such a risk that the observation with a high degree of resolution is hindered. However, in this embodiment, since two coils 105, 106 are disposed in one magnetic circuit 107, the dimensions of the reflector oscillating apparatus, in particular, the height thereof, can be reduced to a value less than one-half of that of the apparatus in the above-mentioned first and second embodiment.

5) In the above-mentioned first and second embodiments, should the transient time be shortened, the size of the linear motor is made to be large, and accordingly, the number of turns of coils becomes large, causing an increase in impedance so that an extremely high drive voltage is required in order to make a fast rise-up. However, in this embodiment, since the coils 105, 106 are disposed in the magnetic circuits 107, 107a, 107b, and currents run therethrough in directions reverse to each other so that magnetic fields produced by the coils are canceled with each other, thereby it is possible to greatly reduce the impedances of the coils 105, 106. With this arrangement, even though current having a fast rise-up are fed to the coils 105, 106, the drive voltage does not become large, and accordingly, the power source voltage of drive amplifiers can be restrained to a value which can be realized.

It is noted that "the interference between two coils" as shown by reference numerals 124, 125 in FIG. 15, does not affect substantially the drive of the secondary mirror 101 if current feed-back type amplifiers 124, 125 are used as drive amplifiers.

Figure 13B:
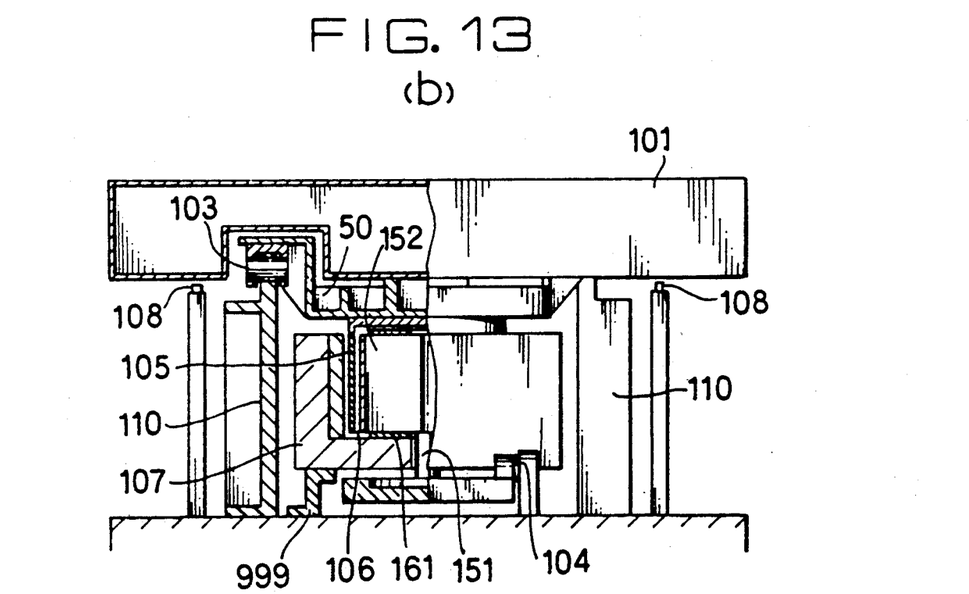

Further, when the coil attaching structure, in particular, the attaching structure of the compensating plate drive coil 106 is arranged as shown in FIG. 13, two coils 105, 106 are disposed in the magnetic circuit 107, and accordingly, the above-mentioned advantages can be realized.

Figure 16:
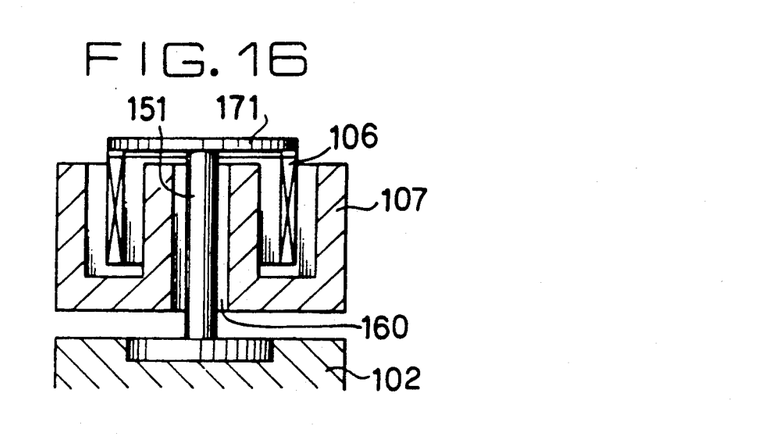
FIG. 16 is a constructive sectional view illustrating an essential part of a secondary mirror oscillating apparatus according to the fourth embodiment of the present invention.
Figure 17:
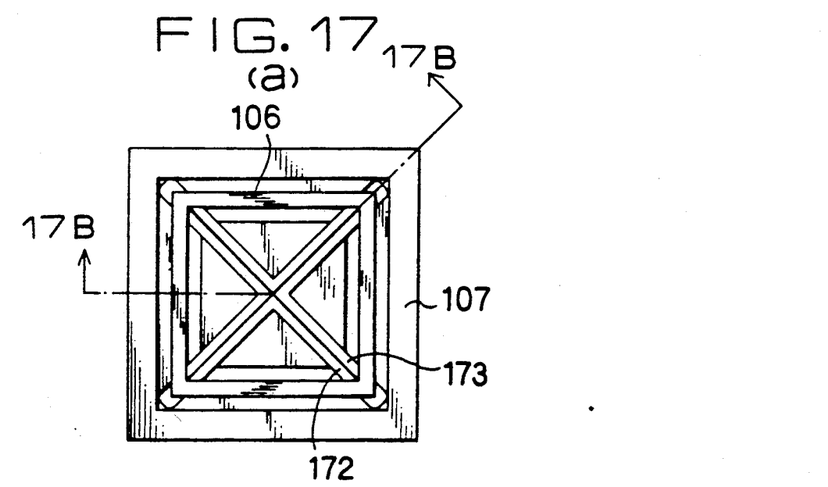
FIG. 17(a) and 18(a) are plan views respectively illustrating essential parts of the secondary mirror oscillating apparatus according to the fifth and sixth embodiments of the present invention.
FIGS. 17(b) and 18(b) are cross-sectional views respectively along the line 17B-17B in FIG. 17(a) and the line 18B-18B in FIG. 18(a).
Figure 18:
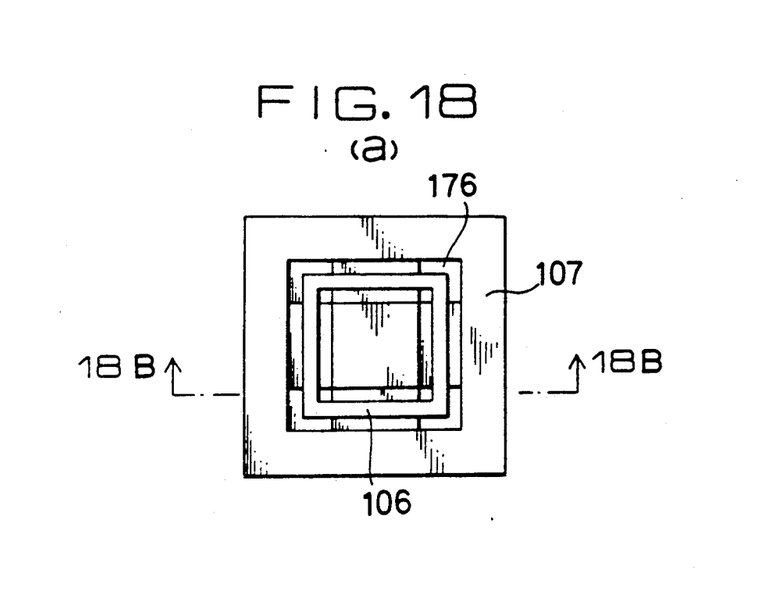

Incidentally, although it has been explained that the coil attaching structure is arranged as shown in FIG. 13, the similar advantages can be obtained if the structure shown in FIG. 16, FIG. 17(a) and (b) or in FIG. 18(a) and (b) is used.

FIG. 16 is a sectional view illustrating an essential part of a fourth embodiment of the present invention, in which there is shown an upper planar plate 171 connecting between the coil 106 and the center pole 151. In this embodiment, a through-hole 160 is formed at the center of the magnetic circuit 107, and the coil 106 is supported to the magnetic circuit 107 on the side remote from the open side through the intermediary of a coil support member composed of a center pole 151 piercing through the through-hole 160 and a plate 171 attached to an end of the center pole 151.

FIG. 17(a) illustrates an essential part of a fifth embodiment of the present invention, and FIG. 17(b) is a sectional view along the line 17B–17B in FIG. 17(a). In these figures, there are shown planar plates 172 which support the coil 106, and through-slits 173 which are formed in the magnetic circuit 107 and through which the planar plates 172 pierce. Accordingly, the magnetic circuit 107 are formed therein with a plurality of through-slits 173, and the coil 106 is supported to the magnetic circuit 107 on the side remote from the open side by a support member composed of the planar plates 172 piercing through the through-slits 173.

FIG. 18(a) is a plan view illustrating an essential part of a sixth embodiment of the present invention, and FIG. 18(b) is a sectional view along the line C—C in FIG. 18(a). In these figures, there are shown legs 174 which support the coil 106; bars 175 connecting between the legs 174, and through-holes 176 which are formed in the magnetic circuit 107 and through which the legs 174 pierce. Several through-holes 176 are formed in the magnetic circuit 107 on the side remote from the open side of the gap section, and the coil 106 is supported to the magnetic circuit 107 on the side remote from the open side through the intermediary of a support member composed of a plurality of legs 174 piercing through the through-holes 176 and the bars 175 connecting between the legs.

Incidentally, the present invention has been explained in the form of the secondary mirror oscillating apparatus for a telescope in the abovementioned embodiments. However, the present invention can be also applied to a light scanning apparatus using mirrors or the like, and further, can applied to an apparatus for oscillating a reflector such as a ternary mirror or the like with advantages similar to those obtained in the above-mentioned embodiments.

As mentioned above, in the reflector oscillating apparatus according to the present invention, since currents applied to the coils are subjected to feed-back control with the use of signals from the sensors, the reflector oscillating apparatus having a high speed, high precision and a large amplitude can restrain the external transmission of oscillation to an extremely small value, and further, it is possible to miniaturize the apparatus.

What is claimed is:

1. A reflector oscillating apparatus comprising: a reflector and a compensating plate which are opposed to each other and which can oscillate about oscillating shafts supported respectively by stationary parts; first and second reflector drive coils disposed between said reflector and compensating plate and mounted on said reflector, respectively, on both sides of said oscillating shafts; first and second compensating plate drive coils disposed between said reflector and said compensating plate and mounted on said compensating plate, respectively on both sides of said oscillating shafts; first and second reflector drive magnetic circuits and first and second compensating plate drive magnetic circuits stationarily disposed between said reflector and said compensating plate, for generating attraction forces and repulsion forces, respectively, in association with said coils so as to drive and oscillate said reflector and said compensating plate by use of a couple of forces; and sensors for detecting respectively oscillating angles of said reflector and said compensating plate, whereby currents applied to said coils are subjected to feed-back control in accordance with signals from said sensors.

2. A reflector oscillating apparatus comprising: a reflector and a compensating plate which are opposed to each other and are oscillatable about oscillating shafts respectively supported by stationary sections; first and second reflector drive coils disposed between said reflector and said compensating plate and mounted on said reflector, respectively, on both sides of said oscillating shafts; first and second reflector drive magnetic circuits disposed between said reflector and said compensating plate and mounted on the compensating plate on both sides of the oscillating shafts, for generating attraction forces and repulsion forces in association with said reflector drive coils so as to drive and oscillate said reflector by a couple of forces; first and second compensating plate drive coils mounted on said compensating plate and, respectively, on both sides of said oscillating shafts; first and second compensating plate drive magnetic circuits stationarily mounted and opposed respectively to said compensating drive coils, for generating attraction forces and repulsion forces in association with said compensating plate drive coils so as to drive and oscillate said compensating plate by a couple of forces; and sensors for detecting oscillating angles of the above-mentioned reflector and compensating plate, respectively, whereby currents applied to said coils are subjected to feed-back control in accordance with signals from said sensors.

3. A reflector oscillating apparatus comprising a reflector and a compensating plate which are arranged opposed to each other and are oscillatable about oscillating shafts supported respectively to stationary sections; first and second reflector drive coils disposed between said reflector and said compensating plate and mounted on said reflector on both sides of said oscillating shafts; first and second compensating plate drive coils disposed between said reflector and said compensating plate and mounted on said compensating plate on both sides of said oscillating shafts; first and second magnetic circuits disposed stationarily between said reflector and said compensating plate, for generating attraction forces and repulsion forces in association with said first reflector drive coils and with said first compensating plate drive coils which are present in one and the same gap, and in association with said second reflector drive coils and with said second compensating plate drive coils in one and the same gap, respectively, so as to drive and oscillate said reflector and compensating plates by a couple of forces; and sensors for detecting oscillating angles of said reflector and said compensating plate, whereby currents applied to said coils are subjected to feed-back control in accordance with signals from said sensors.

4. A reflector oscillating apparatus as set forth in claim 3, wherein each of said magnetic circuits is opened on either the reflector side or the compensating plate side and is formed therein with a hole or a slit, either one of a reflector drive coil and a compensating drive coil in one and the same gap is supported by said magnetic circuit on the open side, and the other is supported on said magnetic coil on the side remote from said open side through the intermediary of a coil support member piercing through said hole or said slit.

* * * * *